United States Patent [19]

Okura et al.

[11] Patent Number: 5,147,588
[45] Date of Patent: Sep. 15, 1992

[54] METHOD OF MAKING CARBON/CARBON COMPOSITE

[75] Inventors: Akimitsu Okura, Tokyo; Toushoku Chou, Chiba; Nobuo Kamioka, Kasukabe, all of Japan

[73] Assignees: Akebono Brake Industry Co., Ltd., Tokyo; Akebono Research and Development Centre Ltd., Hanyu, both of Japan

[21] Appl. No.: 536,471

[22] Filed: Jun. 12, 1990

[30] Foreign Application Priority Data

Jun. 16, 1989 [JP] Japan .................................. 1-153667

[51] Int. Cl.$^5$ .............................................. C01B 31/04
[52] U.S. Cl. ..................... 264/29.7; 423/447.8; 423/448
[58] Field of Search ............ 264/29.1, 29.4, 29.5, 264/29.6, 29.7; 423/445, 447.1, 447.7, 447.8, 447.9, 448, 449

[56] References Cited

U.S. PATENT DOCUMENTS 3,970,174 7/1976 Kirkhart ..................... 264/29.5 X
4,297,307 10/1981 Taylor ......................... 264/29.5

FOREIGN PATENT DOCUMENTS 60-16806 1/1985 Japan ........................... 423/448
60-200867 10/1985 Japan .

Primary Examiner—Leo B. Tentoni
Attorney, Agent, or Firm—Oblon, Spivak, McClelland, Maier & Neustadt

[57] ABSTRACT

A hybrid carbon/carbon composite and a method of manufacturing a hybrid carbon/carbon composite, wherein a raw material containing carbon fibers with two or more different lengths and meso-phase carbon as a binder are raw materials. The raw materials are kneaded in the presence of adhesives, dried and defibrated, then molded under heat and pressure by hot press, and thereafter subjected to heat treatment.

5 Claims, 4 Drawing Sheets

Mixing ratio of short carbon fibers with long carbon fibers

METHOD OF MAKING CARBON/CARBON COMPOSITE

BACKGROUND OF THE INVENTION

The present invention relates to a hybrid carbon/carbon composite suitable for use as a friction material for high speed and heavy duty brakes in automobiles, trucks, shinkansen, aircrafts, etc. and a method of manufacture thereof.

It is known that carbon is one of the most excellent heat resistant materials. And, one type of carbon material is a carbon/carbon composite which is reinforced by high-strength carbon fibers and modified by heat treatment (hereinafter abbreviated simply as C/C composite).

Since the C/C composite has a high specific strength and an excellent heat resistance, it is suitable for use as a friction material for brakes used, in particular, for aircrafts.

At the present time, as a method for obtaining such C/C composite, suitable for use as a friction material as shown in FIG. 5, filler (indicated by F in the diagram) such as coke etc. to form a matrix and a binder (indicated by B in the diagram) such as thermosetting resin etc. are mixed, carbon fibers (indicated by CF in the diagram) are added to the mixture, and then resin impregnation is performed for molding. This molded object is subjected to heat treatment to carbonize and/or graphitize the binder, thereby to form the composite. However, when carbonizing by heat treatment, binder is partially decomposed thermally and gasified, so that pores are generated in the matrix. These pores bring not only a decrease in the strength of the composite, but also a generation of introductory pits for oxygen when the composite is used as a friction material for brakes to cause oxidation wear at high temperature resulting in deterioration and further decrease in strength.

For solving this inconvenience, at present, such procedure that the same kind of thermosetting resin as binder is impregnated into the pores and the carbonization thereof is performed is repeated three to seven times to decrease the porosity of the C/C composite.

In the present friction material comprising C/C composite, in order to obtain high density thereof and excellent adhesion between carbon fibers and binder, a method called chemical vapor deposition (indicated by CVD in FIG. 5) is adopted, wherein hydrocarbon gases such as methane, propane, etc. are decomposed thermally at 1000° to 1200° C. in a furnace under vacuum or reduced pressure, so that the decomposed atomic carbon is allowed to intrude into remaining pores of the C/C composite.

For this reason, it takes a term of three to four months for obtaining the product, so that the price of product becomes remarkably expensive. Hence, it is the status quo that there is limited application except for special purposes.

Moreover, one of the inventors previously introduced an invention in Japanese Un-examined Patent Publication No. SHO 60-200867, wherein meso-phase carbon and carbon fibers or graphite fibers are mixed, molded and subjected to heat treatment to obtain a C/C composite. In this application, however, mixing of more than two kinds of carbon fibers with different length with meso-phase carbon is not embodied, further the content of carbon fibers in the previous invention is much less than that in the present invention, so that the strength of the composite is low.

As a result of extensive investigations in view of this situation, a method of manufacturing a highly strengthened C/C composite, which need not impregnation and vaporization each causing an increase in cost, is offered. According to the present invention, a complicated manufacturing process extending over a long period of time is simplified and shortened, and further a hybrid C/C composite having a strength and heat resistance equivalent to a conventional one and being low in price has been developed.

SUMMARY OF THE INVENTION

The main object of the invention is to provide a highly densified and highly strengthened C/C composite. This object is attained in accordance with the invention. According to the invention, a raw material comprising more than two kinds of carbon fibers with different length and meso-phase carbon as a binder is mixed, and molded and subjected to heat treatment. In this case, random orientation of short carbon fibers is effective for obtaining a highly densified and highly strengthened C/C composite.

Moreover, the manufacturing method according to the invention, a raw material comprising more than two kinds of carbon fibers with different length and meso-phase carbon as a binder is kneaded in the presence of adhesives, dried and defibrated, then it is molded under heat and pressure by hot press and thereafter subjected to heat treatment. A method wherein the thermal molding by hot press at a maximum pressure of 500 kg/cm$^2$ and at a maximum temperature of 600° C. followed by the carbonization at 1100° to 1200° C. and then by the graphitization at 2000° to 2500° C. is suitable for obtaining friction materials having good strength.

DETAILED DESCRIPTION OF THE INVENTION

Figure 1:
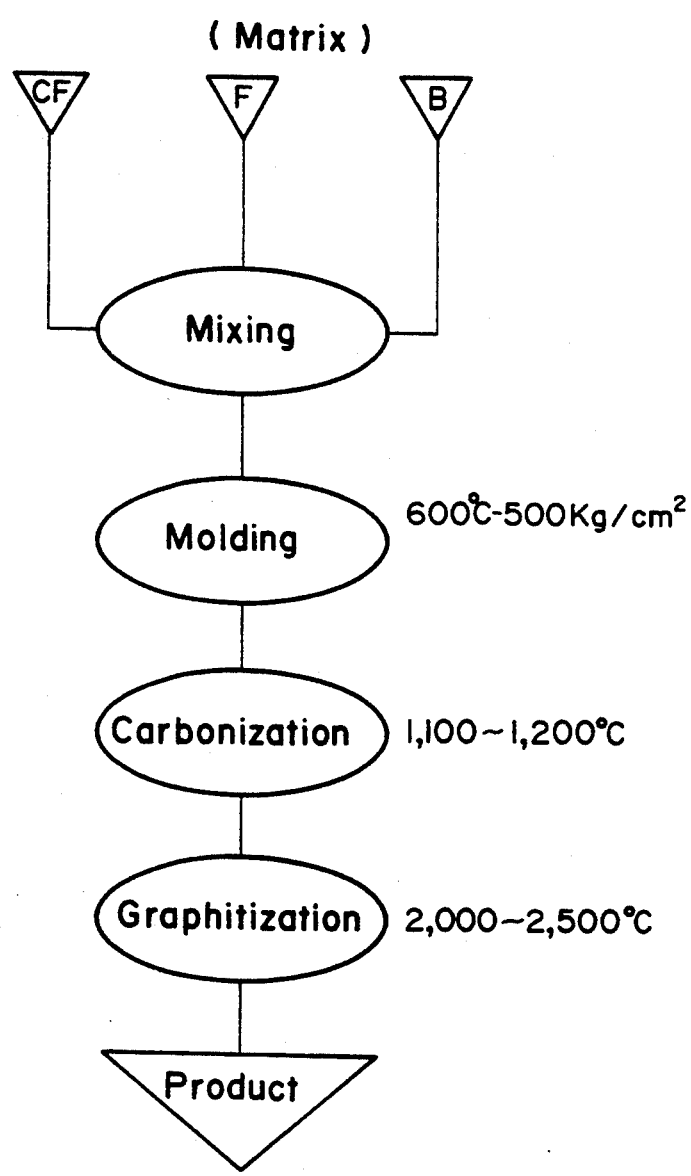
FIG. 1 is an illustration diagram showing the manufacturing process according to the invention.

In following, the invention will be illustrated according to the manufacturing process shown in FIG. 1.

Mixing and agitation

More than two kinds of carbon fibers (CF) with different length, filler (F) to form a matrix and meso-phase carbon being a binder (B) to form a matrix similarly are mixed and agitated. And after adding adhesives, the mixture is kneaded. Then, once dried, it is lightly defibrated to prepare the prime material.

Molding with hot press

After weighing, said prime material is filled into the metal mold of hot press, then pressurized and heated, thereby the binder is allowed to decompose thermally and the reaction of condensation polymerization is Caused to make molded object.

Heat treatment

Said molded object is heated in an inert gas at a given temperature depending on the required characteristics and required performance, thereby the heat treatment is performed for modification.

The reason why the meso-phase carbon is used as a binder and the molding is made by hot press in this way is because the meso-phase carbon has a residual carbon rate higher than the conventional thermosetting resin.

Moreover, the reason why two or more kinds of carbon fibers with different lengths are used is because the filling rate can be improved by short carbon fibers and the mechanical characteristics can be enhanced by long carbon fibers, thereby the improvement in mechanical strength can be achieved.

Furthermore, the reason why are added because of before mixing and agitation is because of that the matrix powder is allowed to adhere firmly around carbon fibers. Ordinarily, since the carbon fibers are bundled with sizing agent, it is required to defibrate them beforehand and to allow them to adhere closely with matrix powder.

By kneading the carbon fibers in the wet-state after the defibration as above, it is possible to allow short carbon fibers to orient randomly. Besides, the reason for allowing them to orient randomly in this way is to deprive them of the directionality in physical properties such as friction and wear characteristics, etc. Particularly, in the application of such composite to the friction material, if using unidirectional oriented fiber or carbon fiber cloth, disposition of the carbon fibers and the matrix are repeated regularly to making the boundaries distinctive, thereby such inconvenience that the soft areas (matrix) are selectively worn to make grooves therein. As a result, there arises a problem that both friction and wear characteristics end up being unstable.

Next, in the invention, because of the use of handy hot press, the binder decomposes thermally with increasing temperature to cause the condensation polymerization and to promote the degasification. Since the pressurized force is kept constant during this period, the condensation of binder corresponding to the reaction takes place, thus it is possible to increase the density without the conventional procedure of impregnation. And, in this case, if the wettability between carbon fibers and binder is improved beforehand through an appropriate surface treatment of carbon fibers, through giving oxygen-containing functional groups (carbonyl group, carboxyl group, hydroxyl group, etc.) to binder and so on, it becomes possible to produce C/C composite having enough strength and good frictional performance even without the procedure of chemical vapor deposition (CVD).

EXAMPLE

Next, the examples of the invention will be illustrated.

First, using the carbon fibers with characteristics shown in Table 1 as reinforcing materials, the coke and the graphite powder shown in the same table as fillers, and further the meso-phase carbon shown in the same table as a binder, the friction materials of about fifty kinds of different formulation examples within respective ranges shown in Table 2 were produced by the method shown in FIG. 1. After examining the characteristics thereof as friction materials, the optimum formulation rates of these formulation materials were determined as shown in Table 3.

TABLE 1

| Formulation material | Function | Specification |
|---|---|---|
| Carbon fiber | Reinforcing material | Diameter: 7 $\mu$m, length: 0.5–50 mm, Tensile strength: 400 kg/mm$^2$, Tensile modulus of elasticity: 24000 kg/mm$^2$, Elongation: 2% |
| Coke | Filler | Petroleum pitch coke, Particle size: 3–6 $\mu$m |
| Graphite Powder | | Flake-shaped graphite |
| Meso-phase carbon | Binder | Volatile matter: 14–18%, quinaline insolubles: 20–30%, H/C (hydrogen/carbon): 0.70–0.80, softening point: 230–270° C. |

TABLE 2

| Formulation material | Formulation rate (vol. %) | Remarks |
|---|---|---|
| Carbon fiber | 20–45 | Strength is in proportion to addition volume of carbon fibers to some extent, is proportional to square root of length of carbon fiber. |
| Coke | 20–50 | Reinforcement of matrix by being dispersed into binder |
| Graphite powder | | Improvement in frictional performance |
| Meso-phase carbon | 20–50 | Binder for above materials |

TABLE 3

| Formulation material | Formulation rate (vol. %) | Remarks |
|---|---|---|
| Carbon fiber | 40–45 | Preferable formulation ratio of short fibers to long fibers was ½. Long fibers are more advantageous for strength, but filling density by hybridization compensates it. |
| Coke | 20–25 | — |
| Graphite powder | 3–5 | This is essential material for improvement in frictional performance, but, if adding over 5%, delamination occurs. |
| Meso-phase carbon | 30–35 | Molding is difficult if under 25%. |

Among these formulation materials, for carbon fibers, those with a length of 0.5, 1.3, 6, 10, 20 or 50 mm were used as in Table 1, and fibers with two different kinds of length comprising short fiber and long fiber were hybridized by combining them, which were mixed and agitated together with the other formulation materials.

Besides, prior to this agitation, experiments were made, wherein fibers with various lengths including carbon fibers with foregoing lengths were combined, mixed and agitated to examine the extent of defibration of fibers. As a result, it was recognized that the carbon fibers with a length of 0.5 mm flocculated mutually between fibers and turned into solid masses with continuing agitation to end up to become so-called fiber balls. And, it was difficult to uniformly mix with long carbon fiber concurrently formulated, even if the defibration conditions might be changed significantly. Moreover, though the carbon fibers with a length of 1 mm were better than those with a length of 0.5 mm, they were still not in sufficient defibration state.

With the carbon fibers with a length longer than this, any combination had no problem and the carbon fibers were defibrated almost perfectly to monofilament units. In addition, as a result of a series of mixing and agitation experiments, if the length became 1.0 mm in the case of short fibers and 50 mm in the case of long ones, some fiber balls often generated depending on the conditions.

In these examples, therefore, two kinds of carbon fibers with different length between 1.0 and 50.0 mm were chosen and combined as shown in Table 4 to make reinforcing carbon fibers. These carbon fibers, fillers and binder were thrown into a commercial omnimixer at formulation rates shown in Table 3 for mixing. Besides, the carbon fibers had been enough defibrated beforehand.

During the mixing, methylcellulose dissolved in a given concentration was added gradually as an adhesive, and the mixture was kneaded further in the wet state. This was once dried to allow the matrix powder to firmly adhere to carbon fibers, and lightly defibrated again with omnimixer to make prime material.

After the prime material was weighed and filled into the metal mold of hot press, the molded object was formed by applying a pressure of 500 kg/cm² and heating finally to 600° C. by gradually raising the temperature. Thereafter, the molded object was submitted to the heat treatment of carbonization at 1200° C. in nitrogen gas and further graphitization at 2000° C., and, of the friction materials after carbonization and graphitization, the density and bending strength were measured, respectively, the results of which are listed together in Table 4 as the inventive friction materials.

Besides, in said friction materials, the formulation rate of short fibers to long fibers was made to be ⅛ to ½ in all cases due to following reason.

Figure 2:
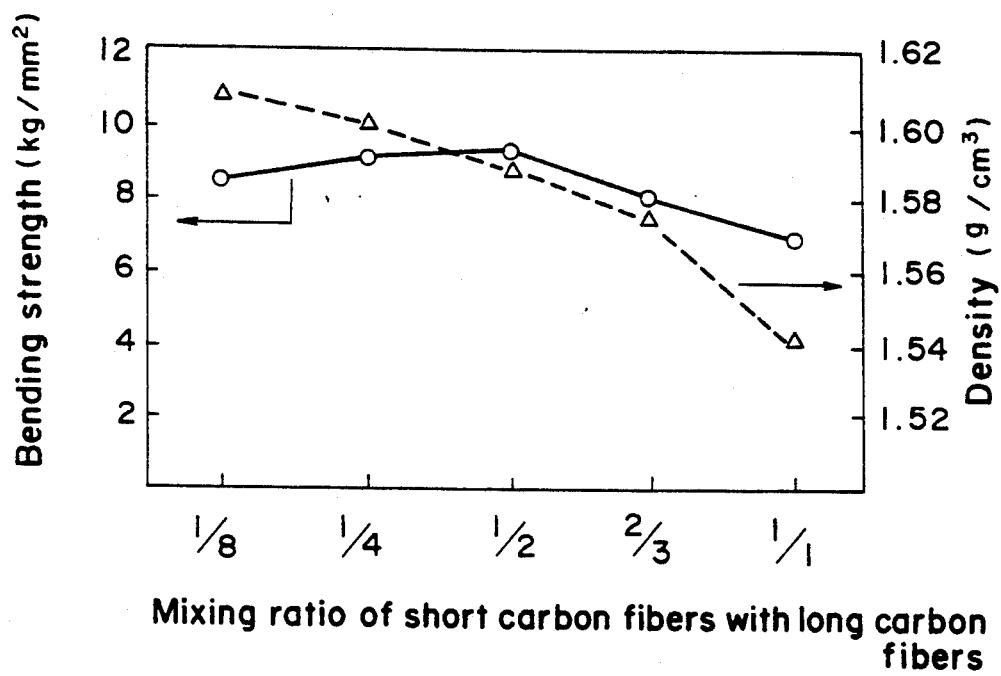
FIG. 2 is a chart showing the changes in bending strength and density when changing the mixing ratio of short carbon fibers to long carbon fibers.

Namely, when mixing and agitating short carbon fibers and long carbon fibers, respective carbon fibers orient randomly, thus they never align regularly. Such form is considered to be ideal that thick and long carbon fibers allotted for the force are disposed in random and thin and short carbon fibers are buried in the spaces created by these mutual carbon fibers. However, when calculating a maximum diameter of carbon fibers to be buried in these spaces, it becomes extremely thin being 1.2 to 3.0 μm, which makes it impossible to respond. In these examples, therefore, using carbon fibers with the same diameter (diameter: 7 μm), the lengths of short fibers and long fibers being 3 mm and 10 mm, respectively, and yet the formulation ratio of short fibers to long fibers being changed from ⅛ to 1/1 as shown in FIG. 2, test pieces with width × thickness × length = 10 × 4 × 35 mm were produced under the conditions aforementioned and the bending strength and density were measured, the results of which are shown in FIG. 2. In the diagram, mark Δ indicates the density and mark ◯ the bending strength.

Figure 3:
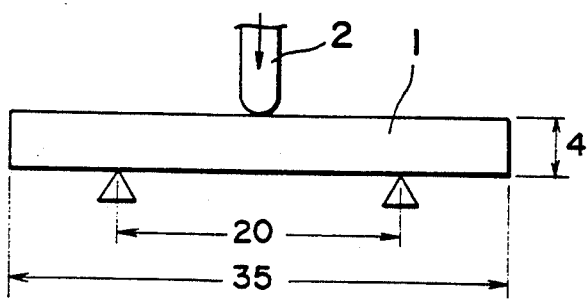
FIG. 3 is a side view showing the method of bending test.

Besides, the bending strength test was performed, as shown in FIG. 3, under the conditions of a distance between supporting points of 20 mm and a velocity of indenter (2) of 1 mm/min for the test pieces (1) with said dimensions.

From FIG. 2, it is considered that, in the hybridization, the filling density is improved even with carbon fibers with same diameter if the lengths are different and this enhanced value increases the formulation volume of carbon fibers to contribute to the improvement in mechanical characteristics.

Namely, the mixing ratio of short carbon fibers is reflected markedly in the filling density. For the bending strength, it can be seen that, if the mixing ratio of short fibers exceeds ½, the strength decreases gradually, though not so remarkable as the case of density. This seems to be due to a decrease in the mixing ratio of long carbon fibers allotted for the mechanical characteristics.

It can be said from this diagram that ½ is the best mixing ratio in the aspect of physical properties, but, Judging from the fact that, when used for the friction materials, the higher the density, the better the oxidation resistance, it can be seen that the best mixing ratio is from ⅛ to ½.

Figure 5:
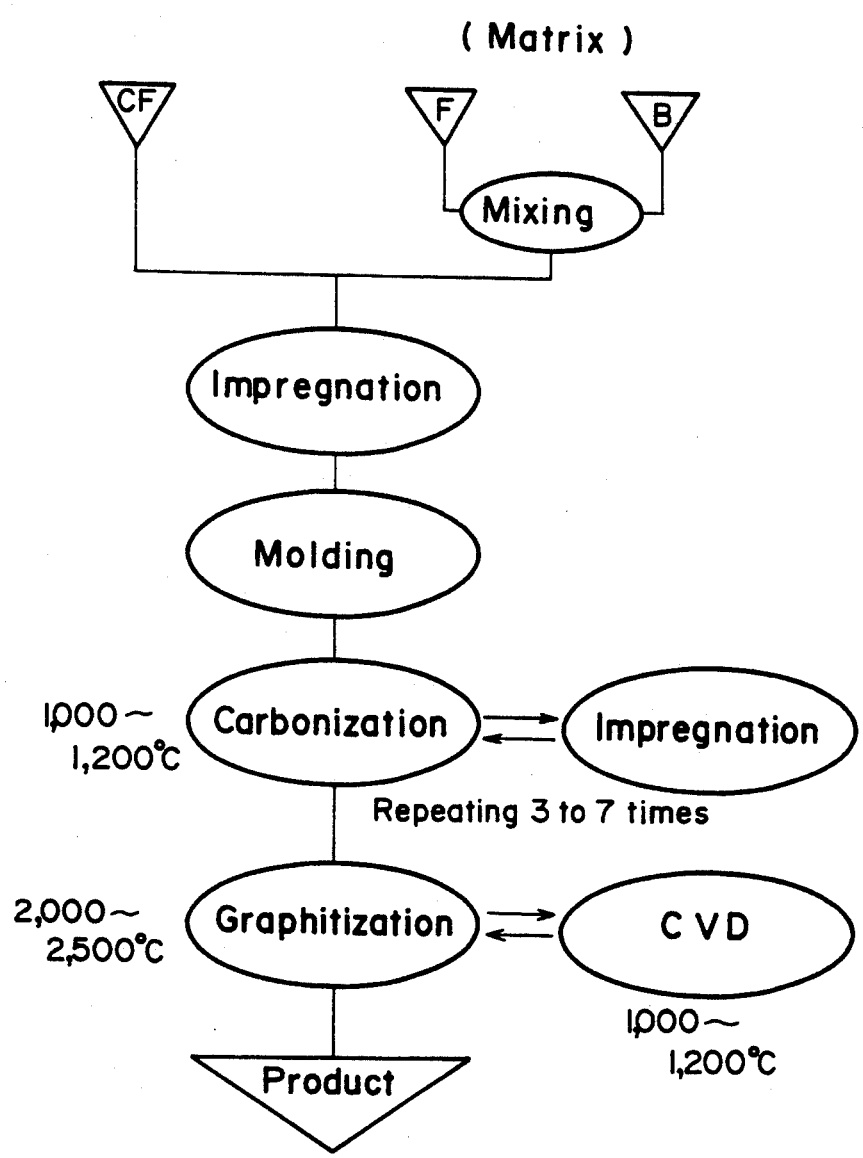
FIG. 5 is an illustration diagram showing the manufacturing process of a prior art.

Besides, for comparison, the density and bending strength of comparative friction materials comprising carbon fibers with a uniform length, and the conventional friction material (reinforced with chopped strand) being a present brake material for aircraft manufactured by the method shown in FIG. 5 using pitch-based material (density: 2.0 g/cm³) as the carbon fibers were also measured. The results are put down in Table 4.

TABLE 4

| Frictional material | No | Combination of short fibers with long fibers | Carbonization (1200° C.) | | Graphitization (2000° C.) | |
|---|---|---|---|---|---|---|
| | | | Density (g/cm³) | Bending strength (kg/mm²) | Density (g/cm³) | Bending strength (kg/mm²) |
| Inventive material | 1 | 1 mm/3 mm | 1.47 | 6.0 | 1.49 | 4.9 |
| " | 2 | 1 mm/6 mm | 1.52 | 6.4 | 1.53 | 5.2 |
| " | 3 | 3 mm/6 mm | 1.55 | 7.8 | 1.58 | 6.4 |
| " | 4 | 3 mm/10 mm | 1.59 | 9.2 | 1.66 | 7.2 |
| " | 5 | 3 mm/20 mm | 1.60 | 9.8 | 1.68 | 8.2 |
| " | 6 | 3 mm/50 mm | 1.60 | 7.2 | 1.63 | 6.0 |
| Comparative material | 7 | 3 mm | 1.45 | 5.0 | 1.49 | 3.8 |
| " | 8 | 10 mm | 1.47 | 5.4 | 1.53 | 4.3 |
| " | 9 | 20 mm | 1.50 | 6.0 | 1.55 | 4.8 |
| Conventional material | 10 | Chopped strand | — | — | 1.75 | 7.5 |

From Table 4, it can be seen that each of the inventive materials through No. 3 to No. 5 has a strength equal to or higher than that of conventional material. Hence, the combination of short fiber length with long fiber for the hybrid C/C composite preferable as a friction material is seen to be within a range of 3 mm/6 mm to 3 mm/20 mm. Moreover, although the graphitization is an essential heat treatment to vary the structure from carbonaceous to graphitic one for improving the friction characteristics, in particular, for stabilizing the friction coefficient, the strength of the materials burned for graphitizing decreases despite the increase in density. This is considered to be due to the partial delamination of carbon fibers from matrix or the minute cracks in the matrix resulting from the remarkable condensation taking place during burning.

Besides, the reason why the conventional material has high density is due to the use of high density pitch-based material for carbon fibers as described above.

Friction test

The frictional performance test was performed by using a friction material showing the best strength among the foregoing examples, and conventional friction material. For the tester, inertial type brake dymamometer was employed.

Figure 4:
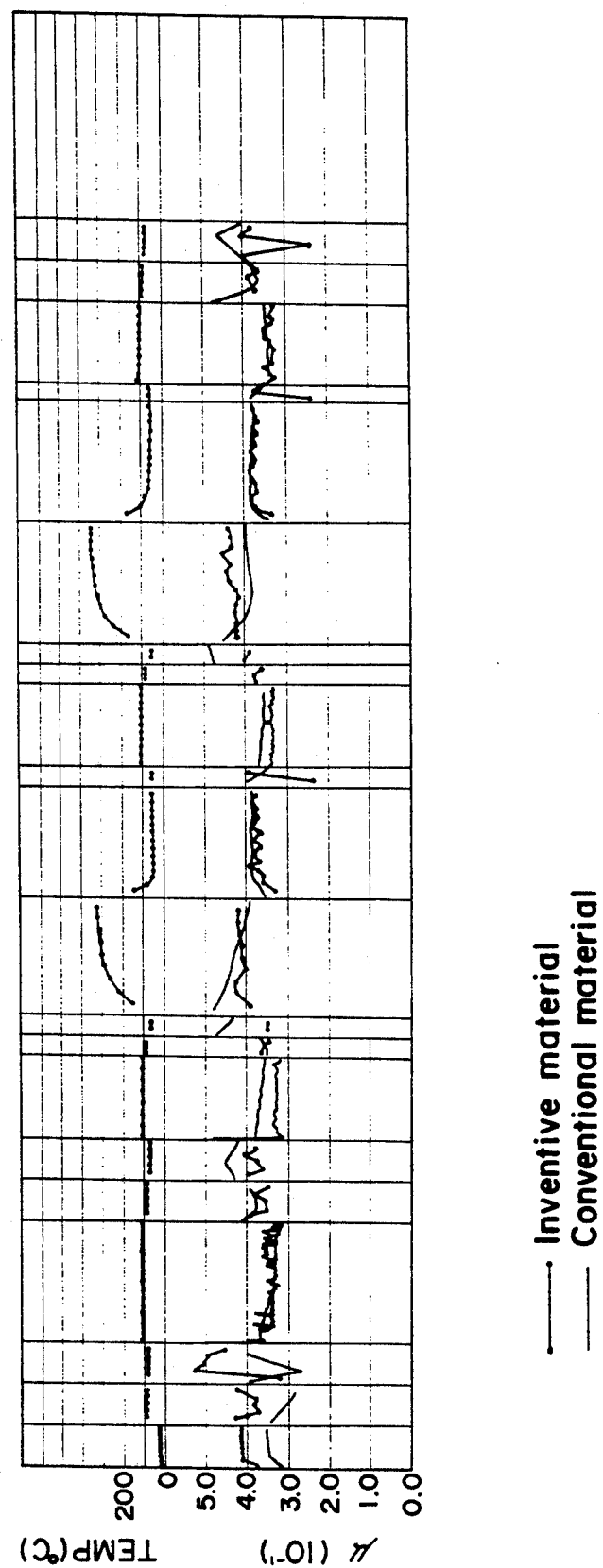
FIG. 4 is a chart showing the results of frictional performance test for C/C composite friction material.

FIG. 4 shows the results of the test.

As evident from FIG. 4, it is clear that the friction material according to the invention has little difference from the conventional material in braking performance.

Moreover, the wear amounts of respective friction materials after the test were 0.60 mm for the inventive material and 0.68 mm for the conventional material. It can be said that there is no significance.

As described, in accordance with the invention, it is possible to obtain high-density and high-strength molded object by handy hot press by adopting a special binder of meso-phase carbon as a binder for friction material. And, by combining (hybridizing) more than two kinds of carbon fibers with different length, the filling density can be enhanced and the strength of product can be improved. The invention therefore exerts conspicuous effects industrially.

What is claimed is:

1. A method of manufacturing hybrid carbon/carbon composite, wherein a raw material containing carbon fibers with two or more different lengths within the range of 3 mm/6 mm to 3 mm/20 mm, and meso-phase carbon as a binder is kneaded in the presence of adhesives, dried and defibrated, then molded under heat and pressure by hot press, and thereafter subjected to heat treatment.

2. The method of manufacturing hybrid carbon/carbon composite for friction materials according to claim 1, wherein after molding at a maximum pressure of 500 kg/cm$^2$ and at a maximum temperature of 600° C. by hot press, carbonization at 1100° to 1200° C. and then graphitization at 2000° to 2500° C. are performed.

3. The method of manufacturing hybrid carbon/carbon composite according to claim 1, wherein the carbon fibers with two or more different lengths comprise the combination of short fibers with long fibers possessing lengths between 1.0 and 50.0 mm.

4. A method of manufacturing hybrid carbon/carbon composite according to claim 1, wherein the mixing ratio of short fibers to long fibers is ⅛ to ½.

5. The method of manufacturing hybrid carbon/carbon composite according to claim 1, wherein the mixing ratio of short fibers to long fibers is ¼.

* * * * *